Patented June 3, 1952

2,599,027

UNITED STATES PATENT OFFICE 2,599,027

SOLUBLE COPOLYMERS OF TRIS-2-ALKENYL ACONITATES AND 2-ALKENYL ALCOHOLS

Pliny O. Tawney, Passaic, N. J., assignor to United States Rubber Company, New York, N. Y., a corporation of New Jersey No Drawing. Application April 15, 1948, Serial No. 21,319

7 Claims. (Cl. 260—78.5)

This invention relates to a new class of soluble, unsaturated polymeric materials which are prepared by the copolymerization of tris-2-alkenyl aconitate with a 2-alkenyl alcohol and characterized in that they can be converted by heat and/or catalysts to insoluble, infusible products by further polymerization or by copolymerization with other unsaturated organic materials capable of addition polymerization therewith.

It is known in the art that tris-2-alkenyl aconitates, e. g., triallyl aconitate, polymerize, albeit slowly, to insoluble, infusible resins before more than a minor proportion of the monomeric material is converted to the polymeric form. Hence, a soluble polymer of triallyl aconitate can be obtained only by halting the polymerization before gelation occurs. This method is disadvantageous, however, not only because of the low yield of soluble polymer but also because it necessitates separation and recovery of the viscous and very high-boiling monomeric triallyl aconitate for use in subsequent polymerizations.

I have now found that the amount of the monomeric triallyl aconitate convertible to the soluble, polymeric form can be markedly increased by copolymerization with a 2-alkenyl alcohol from the class of allyl, 2-methallyl, 2-ethallyl, 2-chloroallyl, 2-chloromethylallyl, 2-hydroxymethylallyl, crotyl, tiglyl, and cinnamyl alcohols, preferably those alcohols of the above class containing a terminal methylene group, e. g., allyl, methallyl and ethallyl alcohols. Suitable tris-2-alkenyl aconitates for my invention include the aconitic esters of any of the abovementioned 2-alkenyl alcohols, those containing a terminal methylene group being preferred, e. g., triallyl aconitate and trimethallyl aconitate.

There is nothing critical about the minimum amount of the selected monomeric tris-2-alkenyl aconitate which is chosen to be converted to the soluble interpolymerizate (it obviously being used in more than negligible amount) and the maximum amount chosen will be in accordance with the desires of the operator, the only criterion being that for each molar equivalent of the aconitate there be used at least 1 molar equivalent of the interpolymerizing alcohol. There is no critical upper limit on the amount of the alcohol, since where it is used in excess of the combining proportions, the excess acts simply as an inert solvent carrier for the formed soluble interpolymerizate.

The reaction is carried out by heating the tris-2-alkenyl aconitate at 25–140° C., preferably in the range of 50–110° C. with 1–15 molar equivalents of the 2-alkenyl alcohol and for a time sufficient to effect an adequate degree of reaction, such reaction times being within the range of 2–150 hours and usually in the range of 50–150 hours.

The reaction is promoted by a source of free radicals such as a peroxidic compound, among which are organic peroxides, e. g., acetyl peroxide, benzoyl peroxide, and tertiary-butyl hydroperoxide, these promoters being employed in amounts of from 0.1–20%, preferably 1.0–15%, by weight of the reactant mixture.

The course of the polymerization reaction can be followed by observing the increase of the viscosity of the reaction mixture. The copolymer can be isolated from the reaction mixture by precipitation through addition of a non-solvent such as diethyl ether or n-hexane. If necessary, further purification can be effected by solution of the copolymer in a solvent such as acetone and reprecipitation with the above-mentioned non-solvents. Concentration of the precipitating baths yields a further amount of lower molecular weight copolymers which are likewise useful in various commercial applications.

My new interpolymers can be cast or molded in a known manner to form rods, blocks and sheets. They can also be dissolved in an appropriate solvent and employed as lacquers or as impregnated and waterproofing compounds. Similar solutions may be prepared directly from the crude copolymerization reaction mixture by the addition of a high-boiling solvent, e. g., xylen, to the reaction mixture and concurrent distillation of any of the unreacted 2-propenyl alcohols.

Application of heat, e. g., at 60–200° C., to compositions containing my new unsaturated copolymers, particularly in the presence of a polymerization catalyst or promoter, e. g., a peroxide, induces further polymerization, and the resulting products are quite indifferent to heat and are strongly resistant to attack by solvents. Suitable addends including pigments, dyes, fillers, and plasticizers, can be incorporated with the interpolymers in the soluble, fusible stage prior to the final cure.

My unsaturated copolymers can be dissolved in organic solvents, particularly in copolymerizable compounds containing an ethylenic linkage such as benzyl acrylate, tolyl acrylate, methyl acrylate, allyl acrylate, butyl methacrylate, vinyl butyrate, diethel fumarate, and diallyl fumarate. The resulting solutions can be totally polymerized to insoluble, infusible products without leaving any solvents to be evaporated. Such solutions can be employed in casting, laminating and impregnating operations, particularly where articles capable of being pre-formed and then "set" or cured in a final shape are desired.

The following examples disclose my invention in more detail. All parts are by weight.

*Example 1*

A mixture of 100 parts of triallyl aconitate, 100 parts of allyl alcohol and 4.1 parts of benzoyl peroxide is heated at 60° C. for a total of 336 hours during which time 29.9 parts of the peroxide are added in approximately equal increments at 24-hour intervals. No gelation occurs.

The reaction mixture is poured into a 50–50 mixture of n-hexane and diethyl ether and the precipitated interpolymer is further purified by repeated solution in the minimum volume of acetone and re-precipitation with the hexane-ether mixture. Drying the product in vacuo to constant weight yields approximately 23 parts of solid interpolymer. Upon concentration of the precipitating baths a further quantity of lower-molecular interpolymers is isolated.

Analysis: Found, per cent hydroxyl, 3.5; iodine number (Wijs), 1949. The hydroxyl content is derived from the interpolymerized allyl alcohol, and the iodine number indicates the residual unsaturation extant which is derived from the interpolymerized triallyl aconitate.

(a) Upon heating a sample of the interpolymer at elevated temperatures, e. g., 120–150° C., it is converted to an insoluble and heat-resistant product.

(b) A 15-part sample of the soluble interpolymer is dissolved in 6.2 parts of diethyl fumarate together with 0.2 part of benzoyl peroxide, and cured by heating in a mold at 60° C. for 21.5 hours and then for 2.5 additional hours at 90° C. The resulting clear casting is resistant to attack by alcohol and acetone.

*Example 2*

One hundred parts of triallyl aconitate are mixed with 100 parts of methallyl alcohol and 2.3 parts of benzoyl peroxide. The mixture is heated at 60° C. for a total of 144 hours during which 13.7 parts of the peroxide are added in equal increments at 24-hour intervals. No gelation occurs.

The reaction product is isolated and purified as in Example 1 to yield 36.6 parts of solid interpolymer together with some lower-molecular weight interpolymers obtainable by concentration of the precipitating baths.

Analysis: Found, per cent C, 63.98; per cent H, 7.40; per cent hydroxyl, 2.1. The analysis corresponds to an interpolymer containing approximately 9.6% by weight of methallyl alcohol and 90.4% of triallyl aconitate.

Upon heating the interpolymer at 100° C. with 1% by weight of benzoyl peroxide, it is converted to a solvent and heat-resistant product.

Having thus described my invention, what I claim and desire to protect by Letters Patent is:

1. An organic solution of an unsaturated acetone-soluble interpolymerizate of monomers consisting of a molar equivalent of triallyl aconitate with at least one molar equivalent of allyl alcohol.

2. An organic solution of an unsaturated acetone-soluble interpolymerizate of monomers consisting of a molar equivalent of trimethallyl aconitate with at least one molar equivalent of allyl alcohol.

3. An organic solution of an unsaturated acetone-soluble interpolymerizate of monomers consisting of a molar equivalent of triallyl aconitate with at least one molar equivalent of methallyl alcohol.

4. A method which comprises interpolymerizing, by heating in the presence of a peroxidic polymerization catalyst, a mixture of monomers consisting of a molar equivalent of a tris-2-alkenyl aconitate from the class consisting of triallyl aconitate and trimethallyl aconitate with at least one molar equivalent of a 2-alkenyl alcohol from the class consisting of allyl alcohol and methallyl alcohol.

5. An organic solution of an unsaturated acetone-soluble interpolymerizate of monomers consisting of a molar equivalent of a tris-2-alkenyl aconitate from the class consisting of triallyl aconitate and trimethallyl aconitate with at least one molar equivalent of a 2-alkenyl alcohol from the class consisting of allyl alcohol and methallyl alcohol.

6. An organic solution of an unsaturated acetone-soluble interpolymerizate of monomers consisting of a molar equivalent of tris-2-alkenyl aconitate from the class consisting of triallyl aconitate and trimethallyl aconitate with at least one molar equivalent of allyl alcohol.

7. An organic solution of an unsaturated acetone-soluble interpolymerizate of monomers consisting of a molar equivalent of a tris-2-alkenyl aconitate from the class consisting of triallyl aconitate and trimethallyl aconitate with at least one molar equivalent of methallyl alcohol.

PLINY O. TAWNEY.

REFERENCES CITED

The following references are of record in the file of this patent:

UNITED STATES PATENTS

| Number | Name | Date |
| --- | --- | --- |
| 2,221,663 | Rothrock | Nov. 12, 1940 |
| 2,332,900 | D'Alelio | Oct. 26, 1943 |
| 2,378,195 | D'Alelio | June 12, 1945 |
| 2,441,516 | Snyder | May 11, 1948 |
| 2,461,735 | Heiberger | Feb. 15, 1949 |
| 2,510,503 | Kropa | June 6, 1950 |